Sept. 10, 1946.  E. J. MARTIN ET AL  2,407,564
LIGHT METER
Filed March 6, 1944
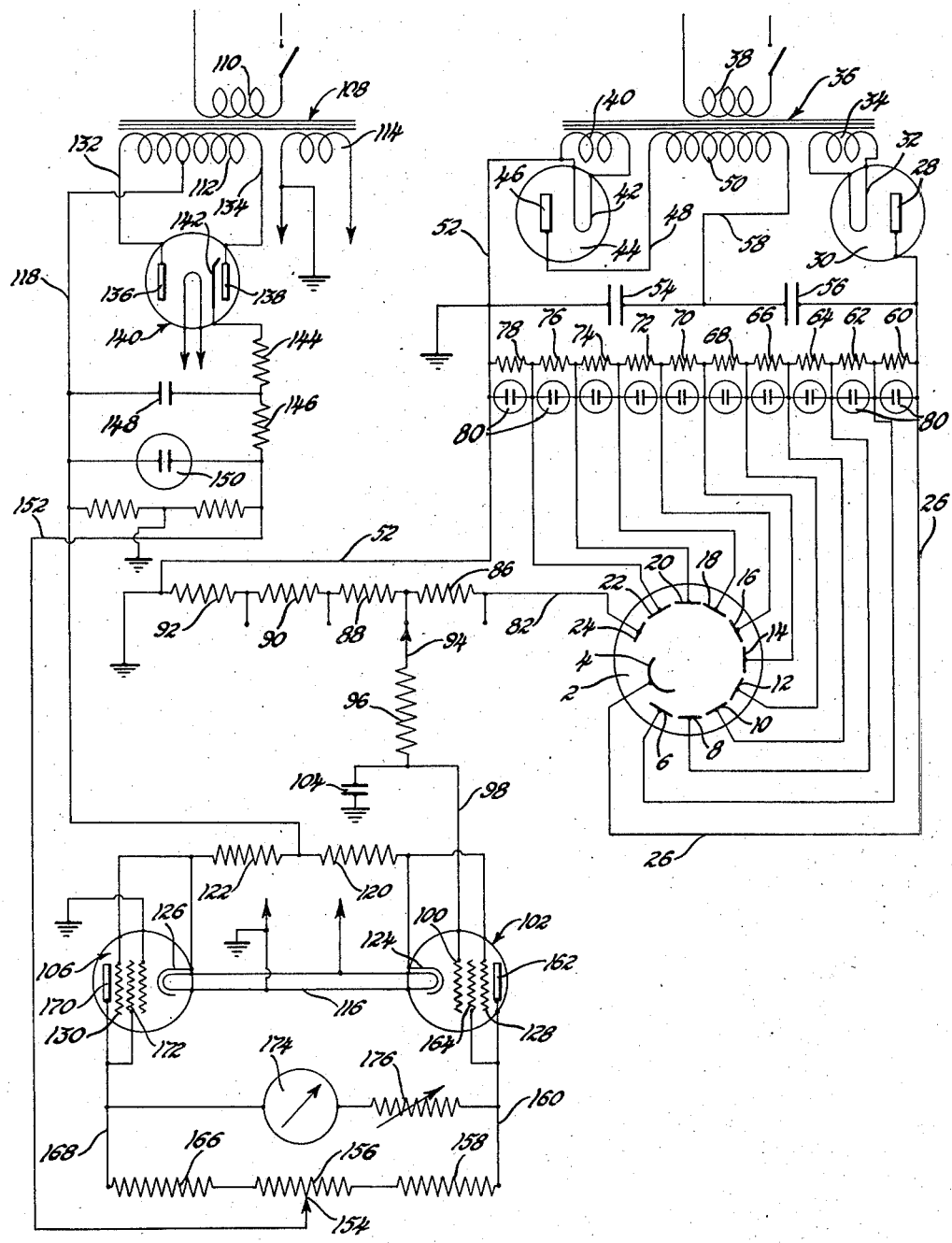
Inventors
Edward J. Martin &
Carl E. Grinstead
By Blackmor, Spencer & Hirt
Attorneys Patented Sept. 10, 1946

2,407,564

UNITED STATES PATENT OFFICE 2,407,564

LIGHT METER

Edward J. Martin, Pleasant Ridge, and Carl E. Grinstead, Detroit, Mich., assignors to General Motors Corporation, Detroit, Mich., a corporation of Delaware Application March 6, 1944, Serial No. 525,318

1 Claim. (Cl. 250—41.5)

This invention relates to measuring means and more specifically to means for measuring minute quantities of light rays or the glow provided by phosphorescent material which has previously been activated by some activating means.

There are of course many instances in which it is desired to know the strength of phosphorescence or ray emitting value of a body or surface and as one example of this may be cited means for printing on sensitized paper from some phosphorescent source. There are in use processes utilizing a layer of phosphorescent paint or radiating material applied to a backing means which has imposed thereon certain configurations which it is desired to reduce, such as drawings, prints, etc. One method of accomplishing this drawing reproduction has been to expose the phosphorescent material to a strong activating means which may be either X rays or light, depending upon the character of the phosphorescent means, and then removing the source of activation and applying to the member a sheet of sensitized material for printing.

However, the rate of decay of glow or radiation of the phosphorescent means varies considerably and it is known that if the temperature is low, this decay in radiation strength can be slowed down considerably. However, before applying the sensitized sheet to make a print or reproduction of the configuration on the phosphorescent means, it is desirable to know whether or not there is sufficient ray activity present in the phosphorescent means to provide printing and also as to the length of time it will be necessary to maintain the sensitized sheet in contact for exposure to obtain a satisfactory print. It will be evident that the amounts of light or activated rays under consideration herein is small.

It is therefore an object of our invention to provide sensitive means for accurately measuring small amounts of radiation in the light spectrum.

It is a further object of our invention to provide means for measuring rays in the light spectrum which is relatively small, portable, sensitive and rugged.

With these and other objects in view which will become apparent as the specification proceeds, the embodiments of our invention will be best understood by the following specification and claim and the illustrations in the accompanying drawing, in which the figure is a circuit diagram showing the electrical system embodying our invention.

Referring now more specifically to the figure, there is shown therein a multiplier phototube 2 having a cathode 4 and a series of multiplier anodes 6, 8, 10, 12, 14, 16, 18, 20, 22 and 24. This phototube is the means which is exposed to the radiation to be measured and is mounted inside of a small box (not shown) having a window therein through which the rays may reach the head of the phototube. The cathode 4 is connected through line 26 to the anode 28 of a rectifier tube 30, the cathode 32 or filament of which is connected across a secondary winding 34 of a compound transformer 36.

The primary 38 of this transformer is connected to a suitable source of commercial current such as a 115 volt power line. A second secondary coil 40 of the transformer 36 provides power for a filament or cathode 42 of a second rectifier tube 44 whose anode 46 is connected through line 48 to a third transformer secondary 50. A line 52 connects one end of the secondary 40 to ground. Connected across lines 26 and 52 are two condensers 54 and 56 which are in series, the midpoint of these condensers being connected by line 58 to a second terminal of secondary 50. These two half wave rectifiers 30 and 44 therefore provide across the two condensers 54, 56 a relatively stable voltage for the various anodes of the photomultiplier tube 2.

In order, however, to have the extreme accuracy necessary and to provide the voltage applied to each anode of the same proportion, it is necessary to provide additional means for maintaining these individual voltages constant over fluctuations in the line voltage. The output voltage applied to lines 26, 52 from the rectifier is applied across a plurality of resistors 60, 62, 64, 66, 68, 70, 72, 74, 76 and 78, all connected in series, which form one large resistance for the total voltage. However, the various interconnecting lines feeding the anodes 6, 8, 10, 12, 14, 16, 18, 20, 22 and 24 are all connected to intermediate positions between these resistances, thus applying to each anode a proportionate part of the total voltage across the output. In order to provide a satisfactory voltage regulator for each small resistance, a voltage regulator tube, such as 80, is connected in parallel across each of the resistances 60, 62, 64, 66, 68, 70, 72, 74, 76 and 78. These tubes are well known in the art, are gas-filled and maintain the voltage across the same constant under varying supply. As an example, the voltage tube used in the present instance has the commercial designation "VR-105-30."

As the electrons are bombarded within the multiplier tube, they are passed on from one anode to another and as such acquire greater speed and number as they proceed until they reach the last anode, therefore developing or multiplying the energy therein. The last anode or output 24 is connected through line 82 to a series of resistances 86, 88, 90 and 92 in series, the last of which is connected to line 52 and thus to ground. The intermediate points of connection between these resistances are connected to taps and are capable of cooperation with an adjustable contact connected to line 94 which in turn is connected to a limiting resistance 96 and thence through line 98 to control electrode 100 of the power amplifier 102. Line 98 is also connected through condenser 104 to ground. Thus tap 94 may be connected to any one of the series of taps provided between the resistances 86, 88, 90 and 92, depending upon the sensitivity available or desired.

A second source of power is provided for the power amplifiers 102, 106 which form a portion of the bridge vacuum tube voltmeter system provided to measure the output of the photoelectric tube 2. This power supply comprises a second multi-winding transformer 108 having a single primary 110 and two secondary windings 112 and 114. Winding 114 provides a small voltage for the heater circuit 116 of the tubes 102 and 106, and is shown as connected through by arrows to simplify the wiring diagram. Secondary 112 has a center tap connected through line 118 with a bridge input connection between two resistors 120 and 122 which are connected to cathodes 124 and 126 of the power tubes 102 and 106, respectively, and also to a further grid 128 and 130 of the same tubes. The two ends of the secondary coil 112 are connected through lines 132 and 134 to the electrodes 136 and 138 of a full-wave rectification tube 140.

An electrode 142 of the tube 140 is connected to resistors 144 and 146 in series, which form a portion of a filter circuit in combination with capacity 148 and with voltage regulator tube 150 which is similar to tubes 80, above described, provides a regulated output from the full-wave rectifier to the bridge circuit incorporating the vacuum tube voltmeter for measuring means. Line 152 connects resistor 146 and one side of the voltage regulator 150 to a variable tap 154 on resistor 156. Resistor 156 has one terminal connected through a second resistor 158 to line 160 to form a third bridge arm which line is commonly connected to the plate 162 of the power amplifier 102 and also to a third grid 164 of the same tube. The opposite end of resistor 156 is in like manner connected through a third resistance 166 to connecting line 168 to complete the bridge, which line is connected to plate 170 and the third grid 172 of the power amplifier 106. Connected across the bridge between lines 160 and 168 is a milliammeter 174 in series with a variable resistance 176.

In the operation of the system as disclosed, the power supply for transformer 36 provides alternating current which is rectified and developed as direct current across the resistor formed of resistances 60, 62, 64, 66, 68, 70, 72, 74, 76 and 78. There are then taken from this total voltage, voltage steps applied to the anodes 6, 8, 10, 12, 14, 16, 18, 20 and 22 which are carefully regulated so that each will be the same as the other and that they will be maintained as nearly constant as possible so that no errors will be introduced due to fluctuations in line voltage. Thus when light is directed on the photo-multiplier through radiation from a phosphorescent surface, an electron stream will flow from cathode 4 to anode 6. This will dislodge additional electrons from anode 6 and cause the original stream to be reflected on the anode 8. Thus a larger group will impinge on anode 8 and this will continue to multiply around the tube to provide a useable amount of energy from a small excitation. Thus voltage will be developed in the line 82 proportional to the amount of excitation of the phosphorescent surface.

This voltage will be applied through one of the taps associated with one of the resistances 86, 88, 90 and 92 and to the control grid 100 of power amplifier 102. This will change the relationship in the balanced bridge composed of power amplifiers 102, 106 and resistances 120 and 122 in two arms and resistances 166, 156 and 158 which may be balanced by the position of the tap 154 on 156. At this time of course power is being supplied to the balanced bridge and specifically to the power amplifiers 102 and 106 through the previously described circuit incorporating transformer 108. In this case also the output of the full-wave rectifier is regulated by voltage regulator tube 150 to eliminate as much as possible any fluctuation in the power supplied to the bridge, and any variation in the supply to the amplifier tubes is applied equally to both and since they are situated in adjacent bridge arms, the effect will cancel out.

Thus as the current flow through one leg of the bridge varies due to the output of tube 2, current will flow across the bridge through the milliammeter 174 and this current will be directly proportional to the amount of unbalance as introduced by flow through power amplifier 102. Thus milliammeter 174 may be calibrated to read directly in terms of radiation from the surface of the phosphorescent layer.

We claim:

In means for measuring the luminescent radiation of small quantity from a phosphorescent surface, a source of alternating current, means for rectifying said current connected to said source, tapped resistance means connected across the rectifier output, said taps dividing said resistor into a plurality of substantially equal parts, a photosensitive multiplier tube having a plurality of electrodes sequentially engaged by electron streams, means for connecting each of the electrodes to a tap and voltage regulation means connected across each adjacent pair of taps to provide constant voltage to each electrode.

EDWARD J. MARTIN.
CARL E. GRINSTEAD.